(12) United States Patent
Hanna

(10) Patent No.: US 7,947,614 B2
(45) Date of Patent: May 24, 2011

(54) MULTI-LAYERED FIRE RETARDANT

(76) Inventor: Rinoud Hanna, Rochester, NY (US)

( * ) Notice: Subject to any disclaimer, the term of this patent is extended or adjusted under 35 U.S.C. 154(b) by 0 days.

(21) Appl. No.: 12/533,240

(22) Filed: Jul. 31, 2009

(65) Prior Publication Data

US 2011/0027500 A1    Feb. 3, 2011

(51) Int. Cl.
B32B 27/04 (2006.01)
B32B 27/12 (2006.01)
B32B 27/20 (2006.01)

(52) U.S. Cl. ............ 442/136; 442/32; 442/43; 442/58; 428/920; 428/921

(58) Field of Classification Search ............ 442/32, 442/43, 58, 136; 428/920, 921
See application file for complete search history.

(56) References Cited

U.S. PATENT DOCUMENTS

| | | | |
|---|---|---|---|
| 5,971,034 A | 10/1999 | Heisey et al. | |
| 6,068,907 A | 5/2000 | Beauregard | |
| 6,914,020 B1 | 7/2005 | Beckmann | |
| 6,992,027 B1* | 1/2006 | Buckingham et al. | 442/149 |
| 7,097,911 B2 | 8/2006 | Arthurs et al. | |
| 2003/0124397 A1* | 7/2003 | Kim et al. | 428/920 |
| 2006/0035052 A1 | 2/2006 | Shih | |
| 2006/0035553 A1 | 2/2006 | Bader et al. | |
| 2007/0196681 A1* | 8/2007 | Biggs et al. | 428/550 |
| 2008/0155923 A1 | 7/2008 | Teng et al. | |
| 2008/0172967 A1 | 7/2008 | Hilburn | |
| 2008/0245007 A1 | 10/2008 | McDonald | |

OTHER PUBLICATIONS

29313209, May 26, 2009, Hanna, Rinoud.

* cited by examiner

Primary Examiner — Norca L Torres-Velazquez
(74) Attorney, Agent, or Firm — Tracy P. Jong

(57) ABSTRACT

Disclosed is a multi-layered metal panel with a fire retardant inner core disposed between two wire mesh layers. The fire retardant inner core is a substrate coated with a fire retardant material. The wire mesh layers on top and bottom of the inner core affix the fire retardant inner core in between. A wire frame surrounds the peripheral edge of the wire mesh layers to provide structural rigidity to the panel. A protective sheet surrounds the entire panel to protect it from rain and wind.

16 Claims, 2 Drawing Sheets

MULTI-LAYERED FIRE RETARDANT

CROSS REFERENCE TO RELATED APPLICATIONS AND PRIORITY CLAIM

This application claims the benefit of U.S. Ser. No. 29/313,209 filed on Feb. 4, 2009 entitled "Device for Applying Fire Retardant in the Field."

BACKGROUND OF THE INVENTION

1. Field of the Invention

This invention relates to fire retardants, and in particular, a novel non-spray type fire retardant in the form of a multilayered panel that may be used in the outdoor environment for fire suppression.

2. Description of Related Art

A number of methods are used to apply fire retardants inside buildings, motor vehicles, and other items. The fire retardant is often deposited onto substrates such as fiberglass, plastic films, fabrics and paper. For example, fire retardant fiberglass impregnated with the fire retardant and held together with adhesives or covered with gel is used in sound and heat insulation for motor vehicles and ducts.

These substrates are often supported with polystyrene foam, polyurethane foam and mineral or gypsum boards. These fire retardant devices enter into the manufacturing of panels and tiles for walls and ceilings and other indoor applications.

However, no fire retardant is known for use with forest and brush fires, or to prevent the spread of fire from a lawn to a structure, that does not require distribution of a spray or powder and is so safe and effective it can be used on a wide array of species. Thus, it is desirable to provide compositions and methods that eliminate one or more of the drawbacks and limitations of the prior art.

SUMMARY OF THE INVENTION

In accordance with this invention, there is provided an improved fire retarding panel that overcomes the limitations of the prior art by using a unique and previously unknown multi-layered fire retarding panel formed of a fire retarding inner core. The inner core is sandwiched between a first supporting mesh layer and a second supporting mesh layer, and the fire retarding inner core comprises a fire retarding substance deposited on a substrate. There is also a wire frame designed to hold the inner core between the first and second supporting mesh layers. The wire frame surrounds the perimeter of the multi-layered fire retarding panel. A protective sheet surrounds the entire panel.

There is also disclosed a multi-layered fire retardant panel where a fire retardant inner core is disposed between two wire mesh layers that compactly affix the fire retardant inner core therebetween, and a wire frame affixed to and surrounding the peripheral edge of the wire mesh layers that supports the wire mesh layers and fire retardant inner core and provides structural rigidity to the panel. Moreover, it provides a way to assemble several panels together to form a fence like structure. Also disclosed is a multi-layered fire retardant comprising a fire retardant inner core disposed between two wire mesh layers that compactly affix the fire retardant inner core there between and a wire frame affixed to and surrounding a periphery of an edge of the wire mesh layers and a protective sheet surrounding an entire exterior surface of the two wire mesh layers and the wire frame and protecting the fire retardant from rain and wind.

It is an object of the present invention to provide a multi-layered fire retardant panel that is adhesive free and free of toxic adhesive vapors when activated by fire.

It is an object of the present invention to provide a multi-layered fire retardant panel that is pollution minimizing.

It is an object of the present invention to provide a multi-layered fire retardant panel that is portable and lightweight.

It is an object of the present invention to provide a multi-layered fire retardant panel that is easy to deploy by a user.

It is an object of the present invention to provide a multi-layered fire retardant panel that is capable of interconnection with other panels.

It is an object of the present invention to provide a multi-layered fire retardant panel that is anchored by pegs to the lawn of a building situated in the line of incoming fire such that the building could be protected from fire.

It is a further object of the present invention to provide a multi-layered fire retardant panel that could be used indoors during building construction, for example, under the roof shingles or behind the dry wall, to become a permanent fire retarding component of the building.

Whereas there may be many embodiments of the present invention, each embodiment may meet one or more of the foregoing recited objects in any combination. It is not intended that each embodiment will necessarily meet each objective.

Thus, having broadly outlined the more important features of the present invention in order that the detailed description thereof may be better understood, and that the present contribution to the art may be better appreciated, there are, of course, additional features of the present invention that will be described herein and will form a part of the subject matter of the claims appended to this specification.

In this respect, before explaining at least one embodiment of the invention in detail, it is to be understood that the invention is not limited in its application to the details of construction and the arrangements of the components set forth in the following description or illustrated in the drawings. The present invention is capable of other embodiments and of being practiced and carried out in various ways. Also it is to be understood that the phraseology and terminology employed herein are for the purpose of description and should not be regarded as limiting.

BRIEF DESCRIPTION OF THE DRAWINGS

The invention will be better understood and objects other than those set forth above will become apparent when consideration is given to the following detailed description thereof. Such description makes reference to the annexed drawings, in which like numerals refer to like elements, and wherein.

Figure 1:
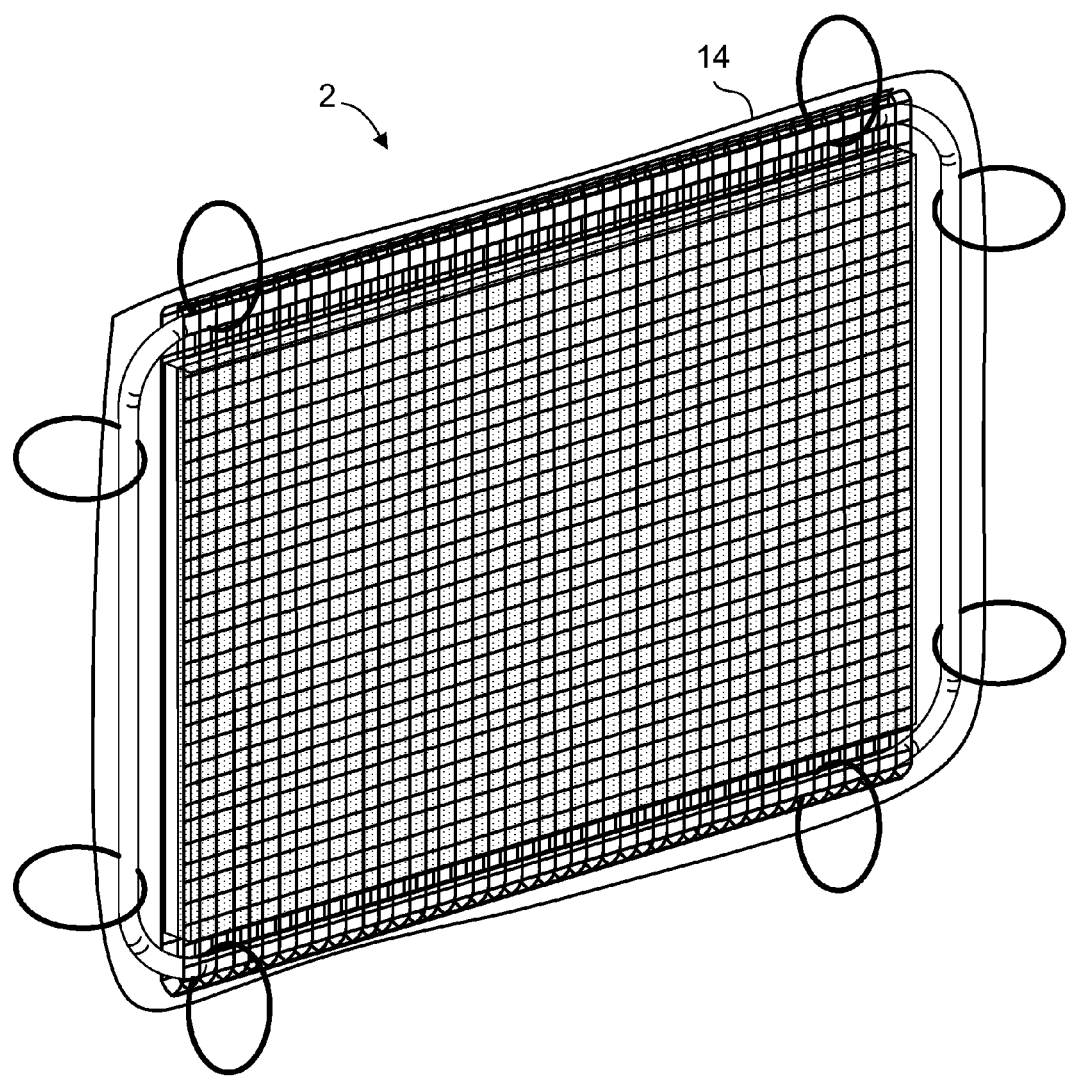
FIG. 1 is a perspective front view of a multi-layered fire retarding panel.

The drawings are not to scale, in fact, some aspects have been emphasized for a better illustration and understanding of the written description.

PARTS LIST 2 multi-layered fire retarding panel
4 wire frame
5 fire retarding inner core
6 substrate
8 fire retarding substance 10 first supporting mesh layer
12 apertures
14 protective sheet
16 second supporting mesh layer

DETAILED DESCRIPTION OF A PREFERRED EMBODIMENT OF THE INVENTION

Figure 2:
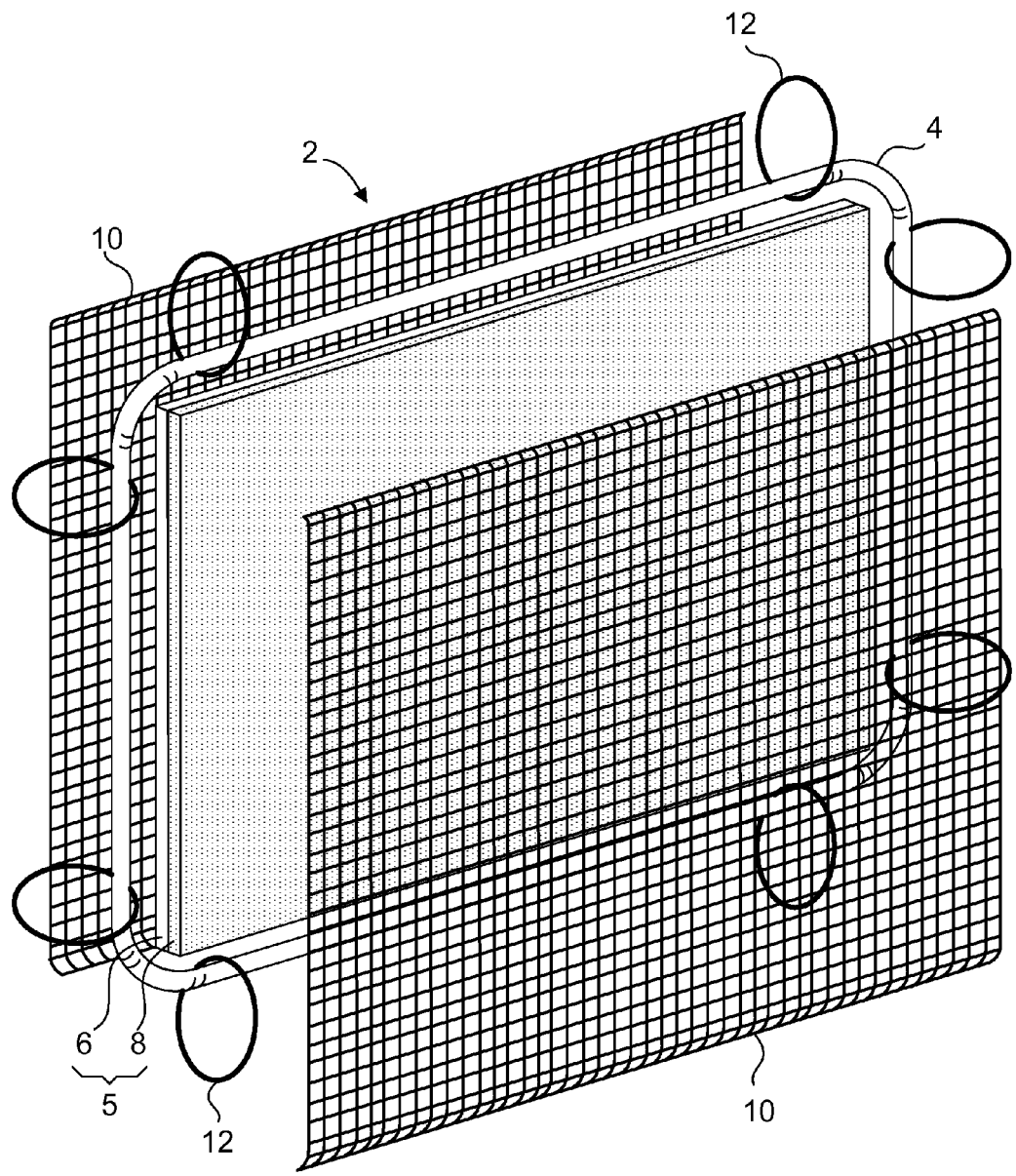
FIG. 2 is an exploded front view of a multi-layered fire retarding panel.

FIG. 1 is a perspective front view of a multi-layered fire retarding panel 2 having a protective sheet 14. FIG. 2 is an exploded front view of a multi-layered fire retarding panel 2 without a protective sheet 14. Referring to FIG. 1, a multi-layered fire retarding panel 2 has at least three layers with a fire retarding inner core 5 sandwiched between a first supporting mesh layer 10 and a second supporting mesh layer 16. The mesh layers 10, 16 support the fire retarding inner core 5 and secure it in place. The panel 2 is most advantageously deployed on outdoor planar surfaces to suppress or prevent the spread of fire, replacing the spray or particulate distribution methods used for fire prevention in yards, forest fire and brush fire situations.

The fire retarding inner core 5 comprises any fire retardant that is capable of long-term storage. Many suitable fire retardants are known in the art that could adapted to this application. In a preferred embodiment, the fire retarding inner core 5 is a fire retarding substance 8 deposited onto a substrate 6. This form is particularly well suited to the application since the substrate 6 is easily inserted during manufacturing and requires nothing more than exposure to fire for activation. Spraying and the like are not necessary, and the simplicity of a coated substrate 5 that does not require moving parts or other additional components to operate greatly reduces manufacturing costs of the unit.

There is also a wire frame 4 designed to hold the inner core 5 between the first and second supporting mesh layers 10, 16. The wire frame 4 extends around at least a portion of the perimeter of the mesh 10, 16. In the embodiment depicted, the wire frame 4 surrounds the entire perimeter of the mesh 10, 16. The wire frame 4 preferably has a plurality of apertures 12 for receiving a mechanical fastener (not depicted). The apertures 12 facilitate the interconnection of two or panels 2. They 12 also provide a means for securing the panels 2 to the ground or a structure such that a target is isolated for fire protection. The wire frame 4 and/or apertures 12 also provide a means to handle the panel 2 without touching the wire mesh layers 10, 16, thereby preventing the wire mesh layers 10, 16 and fire retarding inner core 5 from being disturbed.

Since the combination of the wire frame 4 and mesh layers 10, 16 compactly secure the inner core 5, the fire retarding panel 2 is adhesive-free and thus is free of toxic vapor emissions from adhesives when the fire retarding inner core 5 is activated. The combination also provides a pollution-free means of fire protection and retarding since the first supporting mesh layer 10 and the second supporting mesh layer 16 affix the fire retarding inner core 5 therebetween and contain the product of the fire retarding inner core 5 after activation. There is no messy byproduct to remove after the fire. There is also no waste as in the case or spraying or dusting where much of the fire retardant is wasted. Spraying or dusting also leaves a mess for clean up and may have unintended adverse effects on the environment and/or plant/animal/marine life.

In preferred embodiments, the fire retarding inner core 5 has a protective sheet 14 that shields the fire retarding substance 8 from wind and moisture to protect the fire retarding inner core 5 from wind and water related deterioration due to precipitation, humidity and water exposure during storage. The protective sheet 14 also preserves the moisture content of the fire retardant inner core 5.

The protective sheet 14 may surround the inner core 5 or the outside of the panel 2. In the case where the panel 2 is covered, the protective sheet 14 surrounds an exterior peripheral surface of the first and second supporting mesh layers 10, 16, essentially encasing the panel 2 all around. It may also be applied directly to the fire retarding inner core 5, or to both 2, 5. In one aspect, the protective sheet 14 forms a sealed panel that is substantially water-tight. In one embodiment, the protective sheet 14 is in the form of a thin-film sheet such as a polyolefin stretch thin-film sheet. In another embodiment, a thin plastic sheet without stretch properties is used.

In the embodiment depicted, the fire retarding inner core 5 is a substrate 6 coated with the fire retarding substance 8. In one aspect, the inner core 5 is a substrate 6 coated with a fire retarding material 8. Many such fire retarding materials are known in the art and may be suitably used. The substrate 6 may consisting of paper, cloth, plastic, ceramic, metal and combinations thereof.

The multi-layered fire retarding panel 2 is essentially planar in most aspects (as depicted in FIGS. 1 and 2), and the wire frame 4 and wire mesh layers 10, 16 provide support such that the panel can be positioned horizontally or vertically with respect to the ground, or any angle in between. The planar configuration facilitates easy storage, transportation and deployment. Preferably, the wire frame 4 is affixed to the mesh layers 10, 16 and surrounding their peripheral edge. As such, the wire frame 4 provides structural rigidity to the multi-layered fire retarding panel 2.

The wire frame 4 in the embodiment depicted has both a protective sheet 14 surrounding the exterior surface of the panel 2 to form a sealed panel, and a plurality of apertures 12 for receiving a mechanical fastener. The plurality of apertures 12 protrude from the wire frame and are not contained within the protective sheet 14. The plurality of apertures 12 are wire loops that receive pegs such that the fire retarding panel 2 is secured to a surface targeted for fire protection with pegs or nails inserted through the wire loops and into the surface targeted for fire protection. It may be used in the fashion as one would put stakes into the ground to secure a tent. These apertures 12 also allow the formation of multi-panel structures, wherein at least two fire retarding panels 2 are connected together via the apertures 12 and a mating mechanical fastener. As will be appreciated, wire loops are merely exemplary and other aperture forms may be suitably adapted to perform the intended function. Many known complimentary and cooperating mechanical fastener-aperture systems are known that may be suitably adapted to the present application.

In another embodiment, the panels are an instantaneously deployable multi-layered fire retarding panel assembly comprising at least two (a plurality of) edge to edge interconnected panels. The assembly has a first arrangement where the panels are compactly stored and a second arrangement where the panels shroud the target property requiring protection. The deployment means for the assembly is designed to transposition the instantaneously deployable multi-layered fire retarding panel assembly from the first arrangement to the second arrangement. The means of deployment may be manual such that the panels are installed by hand. Other mechanical systems may be used as well.

The panels 2 contain a minimal amount of combustible material, with the combustible parts being limited to the protective sheet 14 and/or substrate 6. Preferably a fire resistant protective sheet 14 and substrate 6 are used, but this is not required.

While this invention could be used in building construction, its primary function is to be used outdoors. No adhesives are used in making the panel or continuous roll because the wire mesh is securely fastened to the wire frame or a thin plastic sheet surrounds the fire retardant inner core. Hence, no toxic adhesive vapors are emitted.

The product is confined between two wire mesh screens, thus, making it easy to dispose of after the fire attack. If the fire retardant selected has a low melting point, it will simply drip to the ground. In most cases, the fire retardant and its product are retained in the wire mesh after activation such that no residual mess is left after the fire.

The multi-layered fire retarding panel may be used in building construction. It may be used as an underlayment for roofing or siding. It may be used under gypsum board or between walls or under floorboards. It may be used over floorboards and under carpeting or other flooring. It may also be used to isolate combustible parts such as electrical wiring. This is especially advantageous for airplane sections where wiring would benefit from fire protective covering or segregation.

The multi-layered fire retarding panel is especially useful in the outdoors, especially because it is better for the environment and easy to deploy. The panel is rigid and weights less than two kilograms, making It portable and easy to install. Other indoor panels easily weigh as much as twenty pounds making them less efficient for this outdoor application. The fire retardant inner core is confined between the layers, thus making it easy to dispose of following use in a fire. The panels or roll can be easily installed in the yard of a home to prevent forest or brush fire from reaching the living structure. The fire retardant core is not exposed to the environment. Since the fire retardant inner core is confined in between the mesh layers and the protective sheet, birds and animals cannot eat the fire retardant. Flower beds are not disturbed.

PARTICULAR ADVANTAGES OF THE INVENTION

The invention is an alternative to the spraying method in the field. If the fire retardant is sprayed on a narrow strip of land in anticipation of a brush fire, it will contain or inhibit the fire when it reaches the sprayed strip. The multi-layered panel or roll is an alternative to spraying and has the following advantages.

(1) Does not require spraying equipment.
(2) Does not release any toxic vapors since no adhesives or volatile organic compound additives are used.
(3) The fire retardant core is isolated from the environment, such that the retardant is not easily digested by or contacted by wildlife.
(4) The multi-layered panel or roll could be reused if not torched by the fire while sprayed material is lost forever.
(5) The minimal combustible components since it is constructed from metals.
(6) The panel is rigid and its weight does not exceed 2 Kg, while indoor panels easily reach up to 20 lbs. Thus, it is portable and easy to install.

I claim:

1. A multi-layered fire retarding panel comprising:
a fire retarding inner core, the inner core sandwiched between a first supporting mesh layer and a second supporting mesh layer, wherein the fire retarding inner core comprises a fire retarding substance; and
a wire frame designed to hold the inner core between the first and second supporting mesh layers wherein the wire frame is disposed about a portion of a perimeter of the multi-layered fire retarding panel.

2. The multi-layered fire retarding panel of claim 1, wherein the fire retarding inner core further comprises a protective sheet such that the fire retarding substance is shielded from moisture thereby protecting the fire retarding inner core from water related deterioration.

3. The multi-layered fire retarding panel of claim 2, wherein the protective sheet is in the form of a thin-film sheet.

4. The multi-layered fire retarding panel of claim 2, wherein the protective sheet preserves the moisture content of the fire retardant inner core.

5. The multi-layered fire retarding panel of claim 1, wherein the multi-layered fire retarding panel further comprises a protective sheet surrounding an exterior peripheral surface of the first and second supporting mesh layers such that the fire retarding substance is shielded from rain thereby protecting the fire retarding inner core from water related deterioration.

6. The multi-layered fire retarding panel of claim 2, wherein the protective sheet is applied directly to the fire retarding inner core.

7. The multi-layered fire retarding panel of claim 1, wherein the fire retarding inner core is comprised of a substrate coated with a fire retarding substance.

8. The multi-layered fire retarding panel of claim 7, wherein the substrate comprises a substrate selected from the group consisting of paper, cloth, plastic, ceramic, metal and combinations thereof.

9. The multi-layered fire retarding panel of claim 1, wherein the multi-layered fire retarding panel further comprises a plurality of apertures for receiving a mechanical fastener.

10. The multi-layered fire retarding panel of claim 1, wherein the first supporting mesh layer and the second supporting mesh layer affix the fire retarding inner core therebetween thereby containing the product of the fire retarding inner core after activation.

11. The multi-layered fire retarding panel of claim 1, wherein the multi-layered fire retarding panel is adhesive-free and thereby free of toxic vapor emissions when the fire retarding inner core is activated.

12. The multi-layered fire retarding panel of claim 1, wherein the wire frame is a wire frame affixed to and surrounding a periphery of an edge of the first supporting mesh layer and the second supporting mesh layer that supports the first supporting mesh layer, the second supporting mesh layer and fire retarding inner core, and that provides structural rigidity to the multi-layered fire retarding panel such that the panel may be deployed horizontally or vertically with respect to the ground.

13. The multi-layered fire retarding panel of claim 1, wherein the wire frame further comprises
a protective sheet surrounding an exterior surface of the panel to form a sealed panel, and
a plurality of apertures for receiving a mechanical fastener, wherein the plurality of apertures protrude from the wire frame and are not contained within the protective sheet.

14. The multi-layered fire retarding panel of claim 13, wherein the plurality of apertures comprise wire loops that receive pegs such that the fire retarding panel is secured to a surface targeted for fire protection with pegs inserted through the wire loops and into the surface targeted for fire protection.

15. The multi-layered fire retarding panel of claim 14, wherein at least two fire retarding panels are connected together via the apertures and a mating mechanical fastener to form a multi-panel structure.

16. An instantaneously deployable multi-layered fire retarding panel assembly comprising:
- a plurality of edge to edge interconnected multi-layered fire retarding panels, having a first arrangement wherein the panels are compactly stored, and a second arrangement wherein panels shroud property requiring protection, and a deployment means designed to transposition the instantaneously deployable multi-layered fire retarding panel assembly from the first arrangement to the second arrangement; wherein the plurality of edge to edge interconnected multi-layered fire retarding panels comprise
- a fire retarding inner core, the inner core sandwiched between a first supporting mesh layer and a second supporting mesh layer, wherein the fire retarding inner core comprises a fire retarding substance deposited on a substrate; and
- a wire frame designed to hold the inner core between the first and second supporting mesh layers about a portion of a perimeter of the multi-layered fire retarding panel.

* * * * *